(12) United States Patent
Kim et al.

(10) Patent No.: US 7,561,498 B2
(45) Date of Patent: Jul. 14, 2009

(54) OPTICAL PICKUP ACTUATOR HAVING ABERRATION CORRECTING MECHANISM AND METHOD OF ASSEMBLING THE SAME

(75) Inventors: Seok-Jung Kim, Suwon-si (KR);
Jung-Gug Pae, Suwon-si (KR);
Tae-Kyung Kim, Seoul (KR);
Young-Man Ahn, Suwon-si (KR);
Tae-Youn Heor, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 11/311,392

(22) Filed: Dec. 20, 2005

(65) Prior Publication Data
US 2006/0136955 A1    Jun. 22, 2006

(30) Foreign Application Priority Data
Dec. 22, 2004    (KR)    ...... 10-2004-0110310

(51) Int. Cl.
*G11B 7/00*    (2006.01)
(52) U.S. Cl. .............. 369/44.15; 369/112.24; 369/112.01
(58) Field of Classification Search .............. 369/44.14, 369/44.15, 44.16, 44.22, 112.01, 112.02, 369/112.22, 112.24
See application file for complete search history.

(56) References Cited
U.S. PATENT DOCUMENTS 6,895,593 B2 *   5/2005   Kim et al. .................. 720/669
6,944,104 B2 *   9/2005   Tanase et al. ............ 369/44.32
7,304,917 B2 *  12/2007   Shima et al. ............. 369/44.15
7,308,752 B2 *  12/2007   Tanaka ....................... 720/682
2004/0156300 A1   8/2004   Shindo
2005/0190663 A1*  9/2005   Kim et al. ................ 369/44.15

FOREIGN PATENT DOCUMENTS

| EP | 1 089 268 | 4/2001 |
| EP | 1 416 479 | 5/2004 |
| EP | 1 465 171 | 10/2004 |
| EP | 1 486 960 | 12/2004 |
| JP | 09-128785 | 5/1997 |
| JP | 2000-030281 | 1/2000 |
| JP | 2000-215505 | 8/2000 |
| JP | 2001-143303 | 5/2001 |
| JP | 2003-006902 | 1/2003 |
| KR | 2004-032956 | 4/2004 |
| KR | 1020040040290 | 5/2004 |

* cited by examiner

*Primary Examiner*—Thang V Tran
(74) *Attorney, Agent, or Firm*—Roylance, Abrams, Berdo & Goodman, L.L.P.

(57) ABSTRACT

An optical pickup actuator and a method of assembling the same is provided. The method of assembling the optical pickup actuator comprises the steps of providing a blade having at least one objective lens mounting area and an aberration correcting mechanism mounting area, arranging an objective lens in the objective lens mounting area, positioning an aberration correcting mechanism in the aberration correcting mechanism mounting area such that the central point of the aberration correcting mechanism coincides with the central point of the objective lens, tuning the aberration correction mechanism, and adhering the aberration correcting mechanism using an adhesive.

15 Claims, 7 Drawing Sheets

OPTICAL PICKUP ACTUATOR HAVING ABERRATION CORRECTING MECHANISM AND METHOD OF ASSEMBLING THE SAME

CROSS-REFERENCE TO RELATED APPLICATIONS

This application claims the benefit under 35 U.S.C. 119(a) of Korean Patent Application No. 2004-110310, filed Dec. 22, 2004, the entire disclosure of which is hereby incorporated by reference.

BACKGROUND OF THE INVENTION

1. Field of the Invention:

The present invention relates to an optical pickup actuator for use in an optical recording/reproducing apparatus. More particularly, the present invention relates to an optical pickup actuator having an aberration correction mechanism and a method of assembling the same.

2. Description of the Related Art:

Recently, technologies for expanding the storage capacities of optical information recording mediums are becoming increasingly important. One method makes the NA (Numerical Aperture) of an objective lens as large as possible in order to increase a recording/reproducing density of a the recording medium. This in turn, reduces the employed wavelength and produces a concentrated beam spot. A concentrated beam spot results because the diameter of the beam spot is inversely proportional to the NA of the objective lens and proportional to the employed wavelength.

Therefore, in an NA specification where the objective lens is increased from about 0.6 to 0.85, the employed wavelength is reduced from about 635 nm to 405 nm. For example, in comparison to the existing DVD (Digital Versatile Disc) a BD (Blue-ray Disc™) has a recording/reproducing density about 5.5 times as large. However, if an optical axis of an objective lens and a surface of a disc are not substantially perpendicular to one another, comatic aberration may result. The amount of such an aberration is proportional to the thickness of the objective lens and the cube of the NA of the objective lens. Therefore, the thickness of a light transmissive layer in such a BD is reduced from about 0.6 mm (of the existing DVD) to 0.1 mm to reduce the amount of aberration of the beam spot. Consequently, the above-mentioned problems are addressed.

However, because the amount of spherical aberration is also proportional to the fourth power of the NA of an objective lens and a deviation in thickness of a record medium, the recording medium preferably has a thickness deviation within about ±3 μm in order to employ an objective lens having an NA in the order of about 0.85. However, it is relatively difficult to manufacture a recording medium within the above-mentioned range of thickness deviation.

Therefore, in order to employ an objective lens having a high NA in the order of about 0.85, it is preferable to compensate for the spherical aberration which results due to the recording medium thickness deviation. For example, unexamined Japanese Patent Publication Nos. 2000-030281, 2001-143303 and 2003-006902, the entire disclosures of which are hereby incorporated by reference in their entirety, disclose technologies which correct spherical aberrations which occur via a deviation in thickness of a liquid crystal recording medium.

For example, Patent Publication No. 2003-006902 discloses an optical pickup mounted on an actuator moving unit (hereinbelow, referred to as "blade"). The optical pickup is fitted with an objective lens and a liquid crystal device for correcting aberration in unison. Therefore, problems with optical performance deterioration, made worse by a central misalignment between a liquid crystal device and an objective lens, can be avoided.

The optical pickup disclosed in unexamined Patent Publication No. 2003-006902 addressed problems with respect to optical performance deterioration caused by the two optical components by mounting an objective lens along with a liquid crystal device for correcting aberration on the blade. However, the problem remains in that a central deviation may occur between the objective lens and the liquid crystal lens in the course of assembling the objective lens and the liquid crystal device to the blade, which is an injection-molded product.

As a result of investigating the reproducing performance in connection with a positional tolerance of the liquid crystal device for correcting aberration, it has been proposed that about 1% deterioration in jitter value is caused when a deviation in the range of about 25 to 30 nm (the central deviation between the liquid crystal device and the objective lens) occurs. Experiments have found that a deviation of about 0.1 mm may occur while the objective lens and the liquid crystal device are assembled to the injection-molded blade.

Moreover, if a liquid crystal device is fitted in a blade as described above, wiring of lead wires or the arrangement of a flexible substrate for applying voltage to the liquid crystal device may be more complicated.

Accordingly, there is a need for an improved optical pickup actuator which prevents deterioration in optical performance caused by the deviation of the two optical components, and a method of assembling the same.

SUMMARY OF THE INVENTION

Embodiments of the present invention solve at least the above problems and/or disadvantages and to provide at least the advantages described below. Accordingly, an aspect of the present invention is to provide an optical pickup actuator, in which the central deviation between a liquid crystal device for correcting aberration and an objective lens is retained within about 30 nm, thereby preventing deterioration in optical performance caused by the deviation of the two optical components, and a method of assembling the same.

Another object of the present invention is to provide an optical pickup actuator which has a relatively simple wiring arrangement for lead wires to apply voltage to a liquid crystal device for correcting aberration, thereby easing assembly of the optical pickup actuator and a method of assembling the same.

In order to achieve the above-mentioned objects, there is provided an optical pickup actuator comprising at least one objective lens which focuses a laser beam to an optical disc, an aberration correcting mechanism which corrects a wave front of the laser beam incident into the objective lens, a voltage applying substrate which perpendicularly contacts and electrically connects with the aberration correcting mechanism to apply voltage, and a blade which supports the objective lens and the aberration correcting mechanism. The blade moves in tracking and focus directions.

The objective lens, the aberration correcting mechanism and the voltage applying substrate may be mounted on top, bottom and lateral sides of the blade, respectively, and electrical connection may be provided through soldering at a position where a plurality of first lands formed on the aberration correcting mechanism and a plurality of second lands formed on the voltage applying substrate perpendicularly intersect.

According to a preferred embodiment of the present invention, the optical pickup actuator may further comprise a pickup base; and a plurality of wire pairs which movably support the blade in the tracking and focus directions in relation to the pickup base, wherein at least some of the wire pairs are connected to the voltage applying substrate in such a way that voltage can be applied to the aberration correcting mechanism.

It is also preferable that the at least one objective lens comprises a lens for a CD/DVD and a lens for a BD and the aberration correcting mechanism is arranged on the optical axis of the lens for the BD.

In addition, the lens for a BD may be press-fitted in the blade so as to suppress the occurrence of eccentricity.

Furthermore, the blade is preferably formed from a thermosetting resin, which has an injection molding tolerance in the order of about 3 μm.

According to another aspect of the present invention, there is provided a method of assembling an optical pickup actuator, comprising the steps of providing a blade comprising at least one objective lens mounting area and an aberration correcting mechanism mounting area, arranging an objective lens in the objective lens mounting area, positioning an aberration correcting mechanism in the aberration correcting mechanism mounting area such that the central point of the aberration correcting mechanism coincides with the central point of the objective lens, tuning the position of the aberration correcting mechanism and adhering the aberration correcting mechanism using an adhesive.

According to a preferred embodiment of the present invention, the objective lens mounting area is formed in a substantially circular shape and the aberration correcting mechanism mounting area is formed in a substantially rectangular shape.

It is preferable that the objective lens is press-fitted in the objective lens mounting area and the objective lens mounting area is formed of a size about equal to or smaller than the outer diameter of the objective lens which is not more than about 50 mn.

The aberration correcting mechanism mounting area is formed to be larger than the aberration correcting mechanism such that the position of the aberration correcting mechanism can be tuned in x, y directions, wherein it is preferable that the aberration correcting mechanism mounting area is configured to expand about 0.15 mm from three sides of the aberration correcting mechanism.

According to the present invention, the central points of the objective lens and the aberration correcting mechanism may be made to coincide with each other by displacing the aberration correcting mechanism in the x, y directions in the state in which the blade is fixed, or by displacing the blade in the x, y directions in the state in which the aberration correcting mechanism is fixed.

According to the present invention, it is possible that the aberration correcting mechanism may be formed with a pattern ring, and the central point of the objective lens and the central point of the pattern ring may be made to coincide with each other. However, if the objective lens is formed in a BD/DVD compatible lens, a ring is formed on the objective lens and the central point of the aberration correcting mechanism is made to coincide with the central point of the ring. The latter case may be preferable in that precise coincidence between the two optical components can be achieved. Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
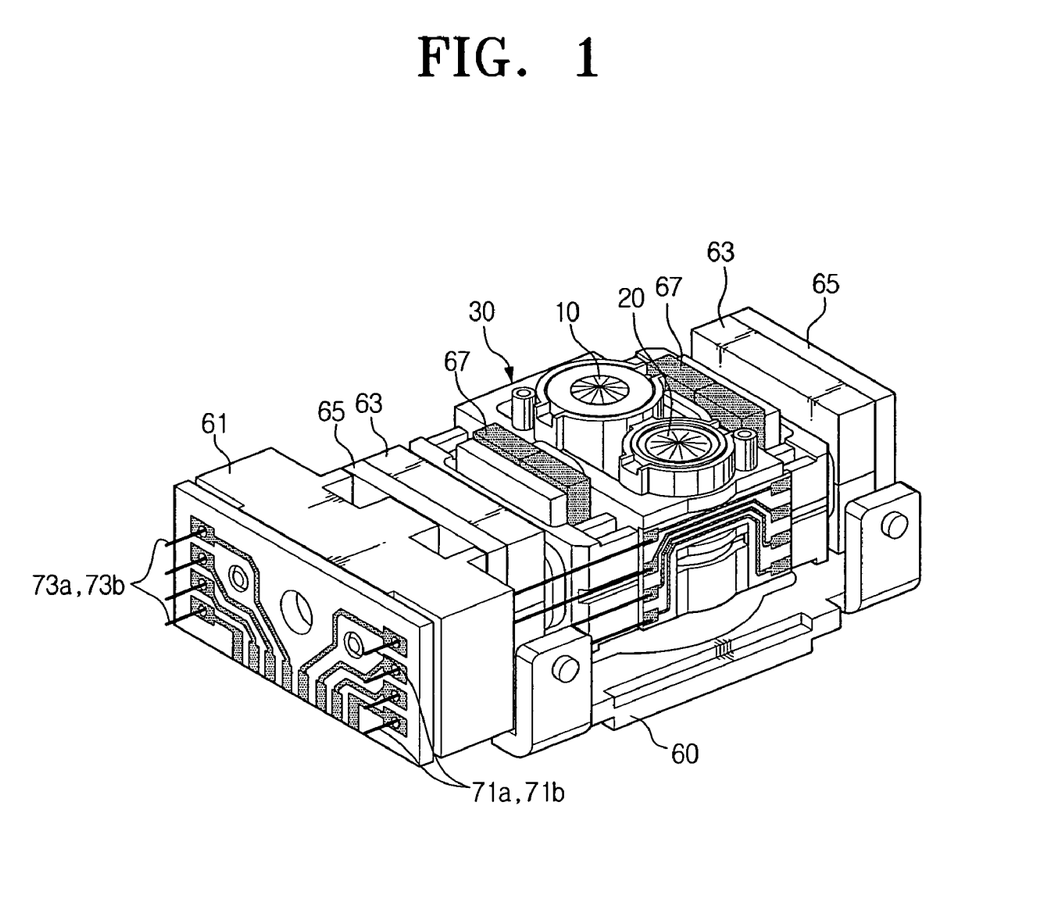
FIG. 1 shows an optical pickup actuator having an aberration correcting mechanism according to an exemplary embodiment of the present invention.
Figure 2A:
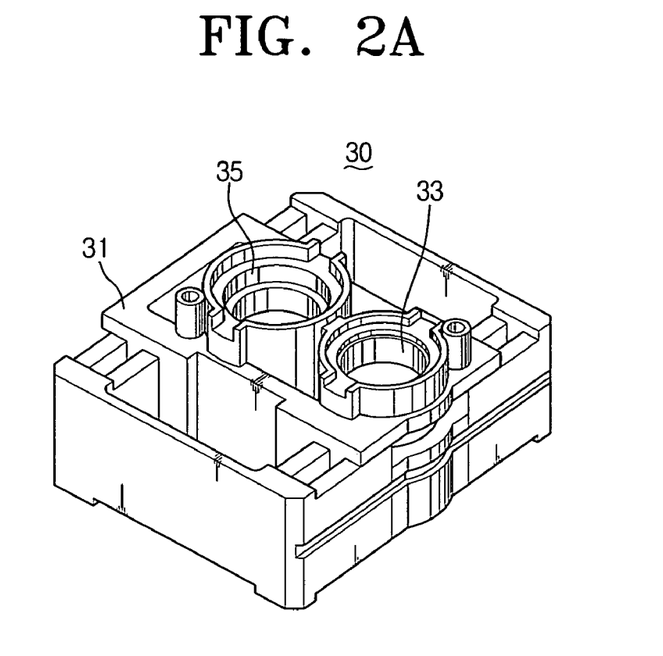
FIGS. 2A and 2B show the blade arrangement of the optical pickup actuator shown in FIG. 1.
Figure 2B:
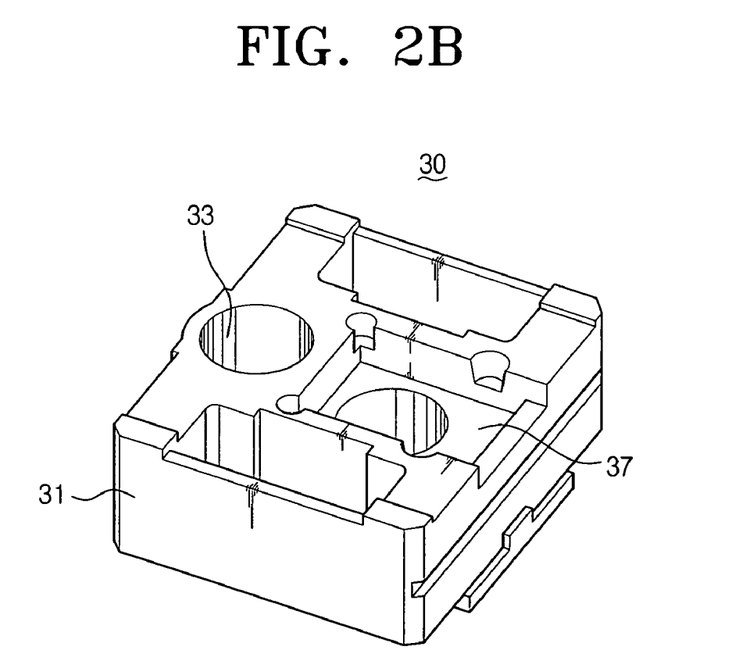

Referring to FIGS. 1, 2A and 2B, reference numeral 10 is an objective lens for a BD (Blue-ray Disc™), and 20 is an objective lens for a CD/DVD. Although the drawings show an optical pickup actuator having two objective lenses 10, 20 as described above, only one objective lens 10 may be provided, such as the BD, or alternatively the CD/DVD.

The objective lenses 10, 20 focus laser beams generated from a light source (not shown) to an optical disc (not shown). The lenses are supported by a blade 30 which is movable in the tracking and focus directions. In the exemplary embodiment, the objective lenses 10, 20 have an NA (Numerical Aperture) in the order of about 0.85.

Figure 5:
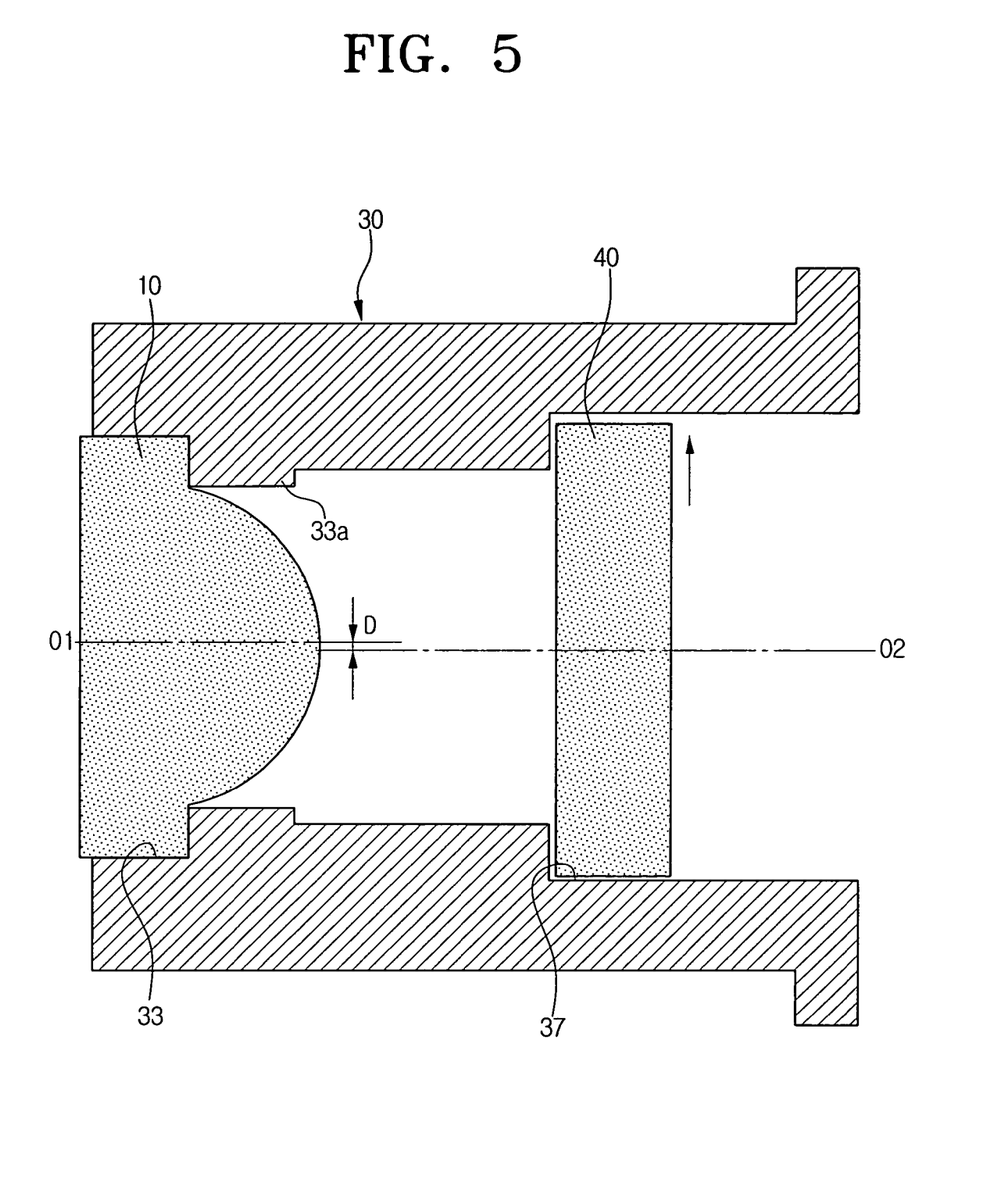
FIG. 5 is a cross-sectional view showing the state in which the objective lens and the aberration correcting mechanism are assembled to the blade according to the exemplary embodiment of the present invention.

The blade 30 comprises a body 31 of a substantially rectangular shape, in which two objective lens mounting areas 33, 35 are adjacently arranged as shown in FIGS. 2A and 2B. One of the objective lens mounting areas 33 is for a BD and the other is for a CD/DVD. The objective lens mounting areas 33, 35 are preferably formed through the upper and lower parts of the body 31. As shown in FIG. 5, an annular locking ridge 33a is inwardly projects from the interior of the objective lens mounting area 33 to support the objective lens 10.

Here, the objective lenses 10, 20, in particular the objective lens 10 for the BD, are arranged, for example by press-fitting, into the mounting areas 33 in the blade, respectively, as described below. The blade 30 is preferably injection-molded from a thermosetting resin of which the injection molding tolerance is in the order of about 3 μm. Although the figure shows a substantially rectangular-shaped blade, the shape of the blade is not limited to the rectangular shape shown in the figure, and other suitable arrangements and constructions may be used.

An aberration correcting mechanism mounting area 37 comprising a substantially rectangular shape is arranged on the lower side of the blade 30 corresponding to a position of the objective lens mounting area 33 for the BD. An aberration correcting mechanism 40 is fitted in the mounting area 37. As will be described later, the aberration correction mechanism 40 can be mounted to the mounting area 37 by using any suitable method such as an adhesive.

Figure 3:
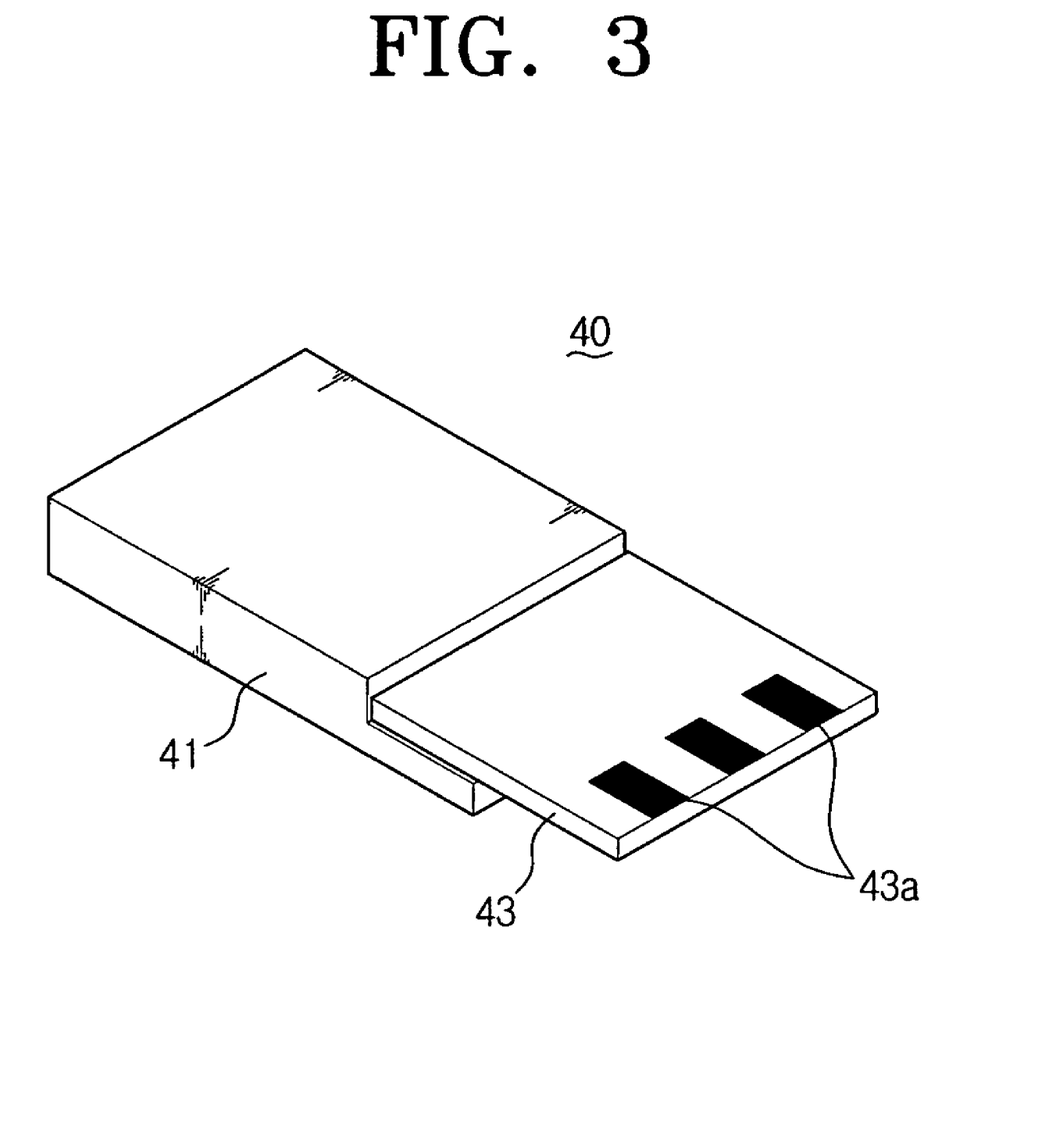
FIG. 3 shows an aberration correcting mechanism for the optical pickup actuator shown in FIG. 2.
Figure 6:
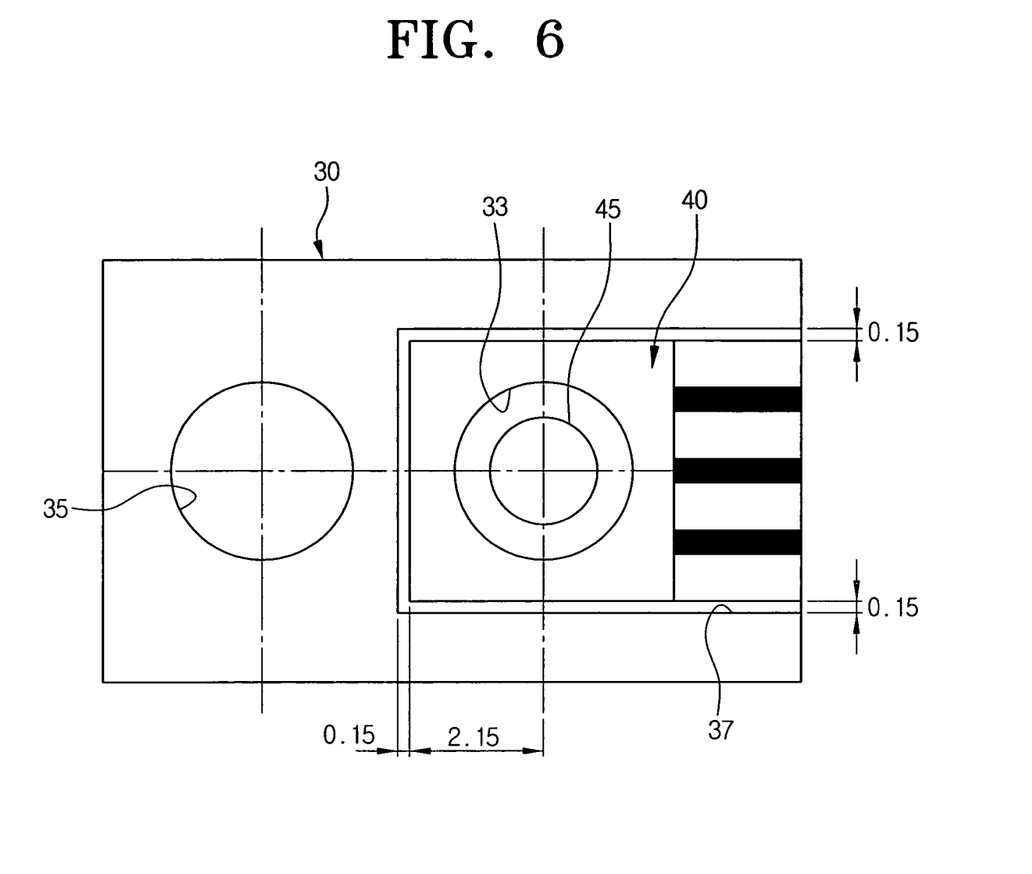
FIG. 6 is a rear-side view showing the state in which the objective lens and the aberration correcting mechanism are assembled to the blade according to the exemplary embodiment of the present invention.

The aberration correcting mechanism 40 comprises a liquid crystal device 41 comprising a substantially rectangular shape and a flexible substrate 43 attached to the liquid crystal device 41. A plurality of first lands 43a are formed on the flexible substrate 43. The lands 43a are used for applying voltage to the liquid crystal device by electrically connecting the liquid crystal device 41 with a voltage applying substrate 50, which will be described later. In addition, as shown in FIG. 6, a pattern ring 45 is formed in the aberration correcting mechanism 40.

Figure 4A:
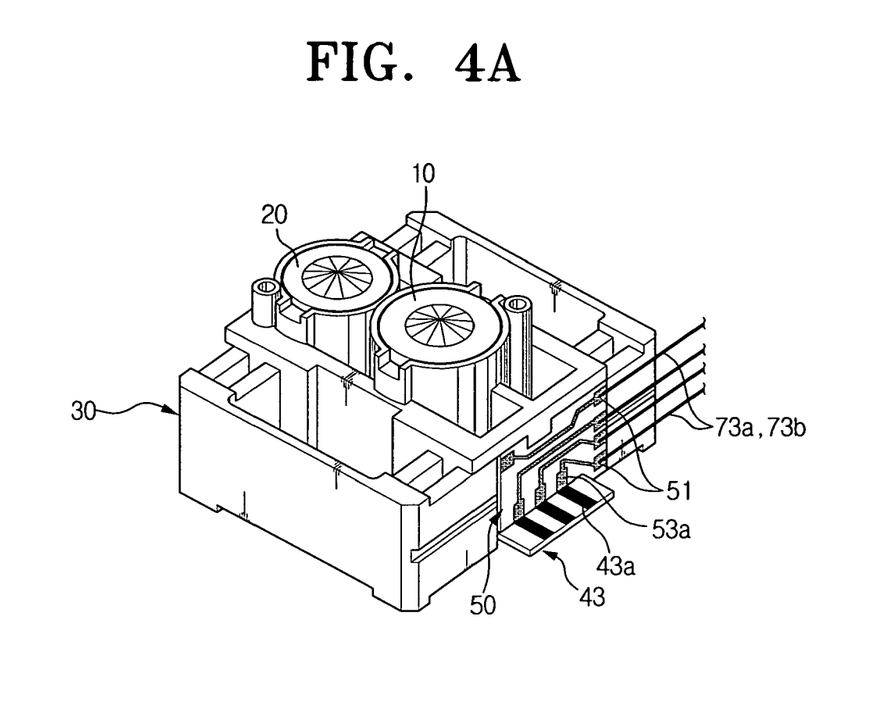
FIGS. 4A and 4B show the aberration correcting mechanism of FIG. 3 assembled to the blade shown in FIG. 2.
Figure 4B:
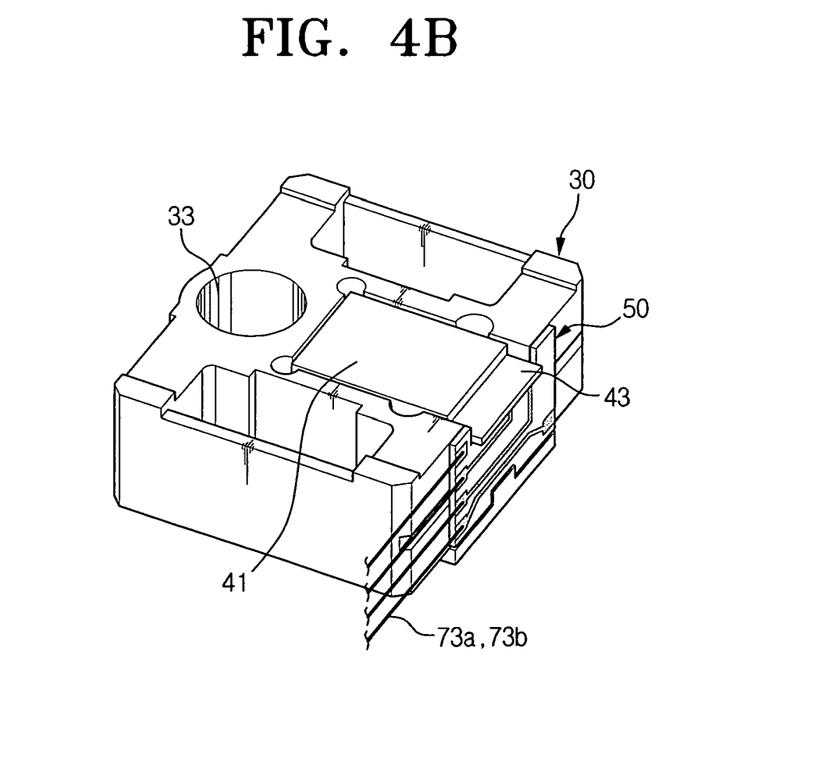

The voltage applying substrate 50 is preferably attached to a lateral side of the blade 30 as shown in FIGS. 4A and 4B. The voltage applying substrate 50 is provided with a plurality of second lands 53a, which are electrically connected with the first lands 43a, preferably by soldering. Soldering is performed a a point of perpendicular intersection between the first lands 43a and the second lands 53a such that externally applied voltage is transferred to the aberration correcting mechanism 40. The voltage applying arrangement for the aberration correcting mechanism 40 can be implemented through a simple soldering process because the first lands 43a and the second lands 53a perpendicularly contact each other when the aberration correcting mechanism 40 is assembled on the lower side of the blade 30. Then the voltage applying substrate 50 is attached to the corresponding side of the blade 30.

Referring to FIG. 1 again, the optical pickup actuator according to the exemplary embodiment of the present invention comprises a pickup base 60 and plurality of pairs of wires 71a, 71b; 73a, 73b movably support the blade 30 on the pickup base 60 in the tracking and focus directions.

The pickup base 60 includes a support member 61, on which one end of each pair of the wires 71a, 71b; 73a, 73b are supported. The pickup base also supports a magnet 63, a yoke 65, and a coil 67 to form a magnetic driving module which moves the blade 30 in the tracking and focus directions.

The other end of each pair of the wires 71a, 71b; 73a, 73b are connected to the opposite sides of the blade 30. In particular, the other end of each pair of the wires 71a, 71b; 73a, 73b are connected to a pattern 51 formed on the voltage applying substrate 50, as shown in FIG. 4A. Therefore, it is possible to externally apply voltage through the wires 73a, 73b. Therefore, the wires 73a, 73b not only serve to suspend the blade but also act as voltage applying lines. Like this, the inventive optical pickup actuator enables relatively simply construction of a voltage applying arrangement for an aberration correcting mechanism where the aberration correcting mechanism and an objective lens are both mounted on the blade which is a movable part.

Now, a method of assembling an optical pickup actuator having the aberration correcting mechanism constructed as described above is explained.

First, a blade 30 including objective lens mounting areas 33, 35 and an aberration correcting mechanism mounting area 37 is prepared preferably by injection-molding a thermosetting resin. The objective lens mounting areas 33, 35 are each formed in a circular shape, and in particular, the objective lens mounting area 33 for a BD is formed to be equal to or smaller than the outer diameter of an objective lens 10 fitted in the objective lens mounting area 33. Therefore, it is possible to press-fit the objective lens in the mounting area 33. Consequently, it is possible to minimize the occurrence of tolerance deviations between the objective lens 10 and the lens mounting area 33. A preferred inner diameter of the objective lens mounting area 33 is less than the outer diameter of the objective lens which is about 10 to 30 nm.

In addition, the aberration correcting mechanism mounting area 37 is formed in a rectangular shape to have a size larger than that of the aberration correcting mechanism 40 so that the aberration correcting mechanism 40 is movable in the x, y directions within the mounting area 37. It is preferable that the aberration correcting mechanism area 37 outwardly expands about 0.15 mm from three sides of the aberration correcting mechanism 40. The size of about 0.15 mm is set on the assumption that the mean size of each side of the aberration correcting mechanism 40 is about 2.15 mm. However, sizes may change in accordance with the applied model.

After preparing the blade 30 as described above, an objective lens 10 is press-fitted into the objective lens mounting area 33 in the blade 30.

The aberration correcting mechanism 40 is positioned in the aberration correcting mechanism mounting area 37 in the blade 30. Then, a position tuning operation is performed to align the center of the previously fitted objective lens 10 and the center of the aberration correcting mechanism 40. At this time, since it is difficult to find the central points of the objective lens 10, the objective lens mounting area 33 and the pattern ring 45 on the aberration correcting mechanism 40 are made to centrally coincide with each other. Such a central coincidence of the two optical components may be performed either by displacing the aberration correcting mechanism 40 in the x, y directions from the state in which the blade 30 is fixed, or by displacing the blade in the x, y directions from the state in which the aberration correcting mechanism 40 is fixed.

Now, with reference to FIG. 5, a method for making the central points of two optical components coincide with each other with be described. For example, when the central point O1 of the objective lens press-fitted in the lens mounting area 33 of the blade 30 and the central point O2 of the aberration correcting mechanism positioned in the aberration correcting mechanism mounting area 37 do not coincide with each other, thereby causing a deviation D, the aberration correcting mechanism 40, which is not fully assembled yet, is displaced in a direction indicated by arrow so that the central points O1, O2 coincide with each other. A monitoring device comprising a microscope, a CCD camera, and a monitor or the like may be used to confirm whether the central points coincide with each other.

Meanwhile, because a predetermined ring pattern is formed on the objective lens when the objective lens is fabricated with a BD/DVD compatible lens, it is possible to align the central point of the aberration correcting mechanism with reference to the center of the ring pattern. In this event, the central coincidence can be more precisely implemented because the two practical optical components desired to centrally coincide are used.

If the central points of the objective lens 10 and the aberration correcting mechanism 40 coincide with each other through the above-mentioned process, the aberration correcting mechanism 40 is adhered in that position using connection method such as an adhesive.

If an optical pickup actuator having an aberration correcting mechanism is assembled as described above, it is possible to maintain a relatively small deviation between the objective lens and the aberration correcting mechanism, preferably not more than about 30 nm. Consequently, optical performance deterioration can be avoided due to a central deviation between the two optical components.

The relative deviation between an objective lens and an aberration correcting mechanism mainly occurs by one or more of: i) an error in coaxiality between the outer circumference and the central point of the objective lens, ii) a deviation between the outer circumference and the central point of the aberration correcting mechanism, iii) an error between the objective lens mounting area and the aberration correcting mechanism mounting area, iv) a tolerance between the objective lens mounting area and the objective lens, and v) a tolerance between the aberration correcting mechanism mounting area and the aberration correcting mechanism.

Items i) and ii) typically occur by component manufacturing tolerances, which are known as in the order of about 10 nm (for item i)) and about 30 nm (for item ii)). Item iii) typically occurs by a misalignment between upper and lower cores in a mold, which is known as in the order of about 10 nm. Items iv) and v) typically occur when the components are fitted in a blade. In summary, with respect to the above-mentioned errors or tolerances, it is necessary to control the deviation between the central points of the objective lens and the aberration correction mechanism within about 10 nm so that the errors do not affect the deterioration of jitter value. However, if the component manufacturing tolerances are not less than about 10 nm, deviation levels are difficult to obtain unless a position-tuning operation is performed.

Accordingly, the present invention can provide an optical pickup actuator which strictly controls the tolerances of an objective lens and an aberration correcting mechanism and which may improve the central deviation between the objective lens and the aberration correcting mechanism.

Figure 7:
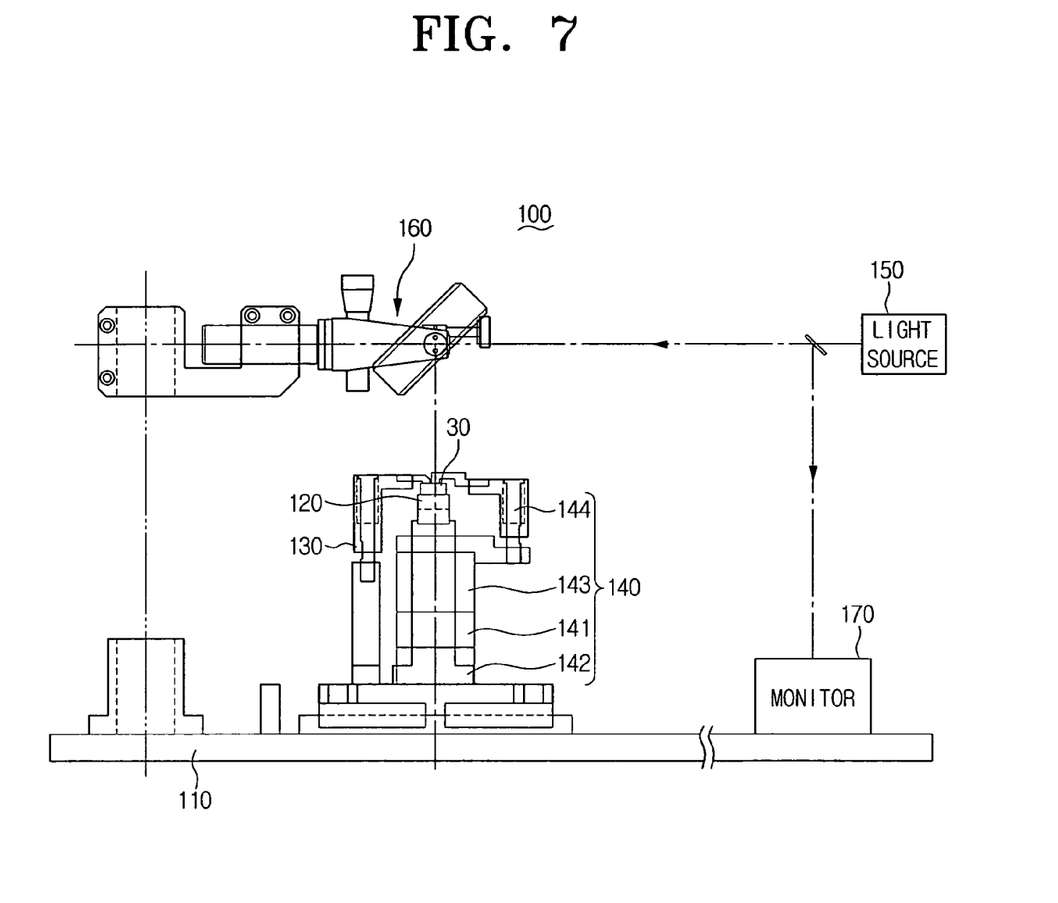
FIG. 7 schematically shows a jig for use in assembling the inventive optical pickup actuator.

FIG. 7 shows an assembling jig 100 for assembling an optical pickup actuator having an aberration correcting mechanism proposed by the exemplary embodiment of the present invention as described above by way of example.

As shown in the drawing, the assembling jig 100 includes a base plate 110, a working table 120 on which the base plate 110 is movably mounted and a blade is also mounted, a lens compression unit 130 for press-fitting an objective lens in the blade lying on the working table 120, a position tuning unit 140 for making the central point of a liquid crystal device for correcting aberration coincide with the central point of the objective lens which is press-fitted in the blade, a light source 150, a reflection mirror unit 160 for reflecting a laser beam radiated from the light source 150 to the working table 120 side, and a monitor 170.

The position tuning unit 140 comprises an x stage 141, a y stage 142, a GONIO stage 143 and a tuning guider 144 attached to the top of the GONIO stage which has a vacuum suction pad. The liquid crystal device for correcting aberration is grasped by the vacuum suction pad of the tuning guider 144, and the tuning guider 144 is movable by the respective stages 141, 142, 143.

A method of assembling an optical pickup actuator using the above-mentioned assembling jig is performed as follows.

First, a blade is arranged on the working table 120 and an objective lens is press-fitted and assembled to the objective lens mounting area 33 of the blade 30 using the lens compression unit 130.

Then, a reference point on a target is determined by illuminating a laser beam of the light source to the objective lens 10.

Then, a liquid crystal device 41 for correcting aberration is vacuum-suctioned and fixed by the tuning guider 144 of the position tuning unit 140. Next, a laser beam is illuminated on the liquid crystal device to compare the liquid crystal device with the reference point on the target.

The GONIO stage 143 is tuned to move a point reflected from the liquid crystal device to the reference point on the target, and finally the liquid crystal device is moved in relation to the central point of the objective lens mounting area in the blade using the x, y stages 141, 142 to make the central points coincide with each other. At this time, it is possible to efficiently and precisely perform the operation while confirming whether or not the central points coincide with each outer using the monitor 170.

By using the above-mentioned assembling jig, it is possible to precisely and easily assemble the optical pickup actuator comprising an optical pickup actuator. Meanwhile, the method for making the central points of an objective lens and an aberration correcting mechanism coincide with each other can be also usefully applied to prevent the deviation of central points of any other optical component attached to the blade and the objective lens.

As described above, because an objective lens and an aberration correcting mechanism can be assembled to a blade with a deviation of not more than about 30 nm, it is possible to provide an optical pickup actuator which prevents optical performance deterioration due to deviations between the two optical components.

Additionally, an optical pickup actuator with a relatively simple electric connection structure between the aberration correcting mechanism and voltage applying substrate can be provided.

Consequently, because it is possible to provide an optical actuator with improved recording and reproducing capabilities and assembly, a reliable optical pickup device and an optical disc apparatus can be implemented.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical pickup actuator comprising:
    at least one objective lens which focuses a laser beam to an optical disc;
    an aberration correcting mechanism which corrects a wave front of the laser beam incident into the at least one objective lens;
    a voltage applying substrate arranged to perpendicularly contact and electrically connect with the aberration correcting mechanism to apply voltage; and
    a blade which supports the objective lens, the aberration correcting mechanism and the voltage applying substrate, wherein the blade moves in tracking and focus directions;
    wherein the at least one objective lens, the aberration correcting mechanism and the voltage applying substrate are mounted on top, bottom and lateral sides of the blade, respectively, and electrical connection is provided via soldering at a position where a plurality of first lands arranged on the aberration correcting mechanism and a plurality of second lands arranged on the voltage applying substrate perpendicularly intersect.

2. An optical pickup actuator as claimed in claim 1, further comprising
a pickup base; and
a plurality of wire pairs which movably support the blade in the tracking and focus directions, wherein at least some of the wire pairs are connected to the voltage applying substrate in such a way that voltage can be applied to the aberration correcting mechanism.

3. An optical pickup actuator as claimed in claim 2, wherein the at least one objective lens comprises a lens for a CD/DVD and a lens for a BD, and the aberration correcting mechanism is arranged on the optical axis of the lens for the BD.

4. An optical pickup actuator as claimed in claim 3, wherein the lens for the BD is press-fitted in the blade.

5. An optical pickup actuator as claimed in claim 1, wherein the blade is formed from a thermosetting resin.

6. A method of assembling an optical pickup actuator, comprising steps of:
providing a blade comprising at least one objective lens mounting area and an aberration correcting mechanism mounting area;
arranging an objective lens in the objective lens mounting area;
positioning an aberration correcting mechanism in the aberration correcting mechanism mounting area such that a central point of the aberration correcting mechanism coincides with a central point of the objective lens;
tuning the position of the aberration correcting mechanism; and
adhering the aberration correcting mechanism using an adhesive;
wherein the aberration correcting mechanism mounting area is configured to expand about 0.15 mm from three sides of the aberration correcting mechanism.

7. A method as claimed in claim 6, wherein the objective lens mounting area is formed in a substantially circular shape and the aberration correcting mechanism mounting area is formed in a substantially rectangular shape.

8. A method as claimed in claim 7, wherein the objective lens is press-fitted in the objective lens mounting area.

9. A method as claimed in claim 8, wherein the aberration correcting mechanism mounting area is formed to be larger than the aberration correcting mechanism such that the position of the aberration correcting mechanism can be tuned in x, y directions.

10. A method as claimed in claim 9, wherein the central points of the objective lens and the aberration correcting mechanism are configured to coincide with each other by displacing the aberration correcting mechanism in the x, y directions when the blade is fixed.

11. A method as claimed in claim 10, wherein the aberration correcting mechanism is formed with a pattern ring and the central point of the objective lens and the central point of the pattern ring are made to coincide with each other.

12. A method as claimed in claim 10, wherein the objective lens is formed with a ring and the central point of the aberration correcting mechanism is made to coincide with the central point of the ring.

13. A method as claimed in claim 9, wherein the central points of the objective lens and the aberration correcting mechanism are made to coincide with each other by displacing the blade in the x, y directions when the aberration correcting mechanism is fixed.

14. A method as claimed in claim 7, wherein the blade is injection-molded from a thermosetting resin.

15. A method of assembling an optical pickup actuator, comprising steps of:
providing a blade comprising at least one objective lens mounting area and an aberration correcting mechanism mounting area;
arranging an objective lens in the objective lens mounting area;
positioning an aberration correcting mechanism in the aberration correcting mechanism mounting area such that a central point of the aberration correcting mechanism coincides with a central point of the objective lens;
tuning the position of the aberration correcting mechanism; and
adhering the aberration correcting mechanism using an adhesive;
wherein the objective lens mounting area is formed of a size about equal to or smaller than the outer diameter of the objective lens, and not more than about 50 nm.

* * * * *